United States Patent [19]
Cholkeri et al.

[11] Patent Number: 5,177,973
[45] Date of Patent: Jan. 12, 1993

[54] REFRIGERATION SYSTEM SUBCOOLING FLOW CONTROL VALVE

[75] Inventors: Pandu R. Cholkeri, Worthington, Tex.; Owen S. Smith, Powell, Ohio

[73] Assignee: Ranco Incorporated of Delaware, Wilmington, Del.

[21] Appl. No.: 671,364

[22] Filed: Mar. 19, 1991

[51] Int. Cl.$^5$ .................................................. F25B 41/00
[52] U.S. Cl. ..................................... 62/214; 62/222; 62/498; 236/93 A
[58] Field of Search ............... 236/93 A; 62/214, 498, 62/216, 222; 251/333

[56] References Cited

U.S. PATENT DOCUMENTS

| | | | |
|---|---|---|---|
| 2,221,062 | 11/1940 | Starr | 236/93 R |
| 2,481,968 | 9/1949 | Atchison | 62/127 |
| 2,735,619 | 2/1956 | Schutt et al. | 236/93 A |
| 3,037,362 | 6/1962 | Tilney et al. | 62/117 |
| 3,296,816 | 1/1967 | Weibel, Jr. et al. | 62/217 |
| 3,367,130 | 2/1968 | Owens | 62/222 |
| 3,388,558 | 6/1968 | Harnish | 62/196 |
| 3,537,272 | 11/1970 | Hales et al. | 62/57 |
| 3,564,865 | 2/1971 | Spencer et al. | 62/197 |
| 3,886,761 | 6/1975 | Santini | 62/217 |
| 3,942,333 | 3/1976 | Kish | 62/217 |
| 4,067,203 | 1/1978 | Behr | 62/208 |
| 4,112,703 | 9/1978 | Kountz | 62/211 |
| 4,254,634 | 3/1981 | Akio et al. | 62/217 |
| 4,267,702 | 5/1981 | Houk | 62/115 |
| 4,335,742 | 6/1982 | Jacyno | 137/494 |
| 4,429,552 | 2/1984 | Reedy | 62/528 |
| 4,459,819 | 7/1984 | Hargraves | 62/212 |
| 4,485,635 | 12/1984 | Sakano | 62/209 |
| 4,498,311 | 2/1985 | Sakano et al. | 62/227 |
| 4,539,821 | 9/1985 | Tamura | 62/228.5 |
| 4,633,674 | 1/1987 | Sato | 62/208 |
| 4,637,220 | 1/1987 | Sakano | 62/200 |
| 4,745,767 | 5/1988 | Ohya et al. | 62/211 |
| 4,747,753 | 5/1988 | Taguchi | 417/222 |
| 4,753,083 | 6/1988 | Sato | 62/209 |
| 4,773,472 | 9/1988 | Aoki et al. | 165/22 |
| 4,778,348 | 10/1988 | Kikuchi et al. | 417/222 |
| 4,779,425 | 10/1988 | Yoshihisa et al. | 62/199 |
| 4,780,059 | 10/1988 | Taguchi | 417/222 |
| 4,780,060 | 10/1988 | Terauchi | 417/222 |
| 4,788,828 | 12/1988 | Sato | 62/214 |
| 4,840,038 | 6/1989 | Sato | 62/210 |
| 4,893,782 | 1/1990 | Franke | 251/333 X |

Primary Examiner—William E. Wayner
Attorney, Agent, or Firm—Watts, Hoffmann, Fisher & Heinke

[57] ABSTRACT

A flow control valve is disclosed in a household refrigeration appliance having a vapor compression refrigeration system comprising a cyclically operated compressor, a condenser, an evaporator and an expansion device between the condenser and the evaporator. The refrigerant flow control valve is disposed between the condenser and the evaporator and comprises a housing defining a refrigerant flow chamber for receiving liquified refrigerant from the condenser outlet, valve seat structure defining a refrigerant flow port for communicating refrigerant from the condenser to the evaporator, and a flow controlling valve assembly coacting with the valve seat structure to control the refrigerant flow from the refrigerant flow chamber to the expansion device. The flow control valve controls system refrigerant flow in response to subcooling, blocks refrigerant flow from the condenser when the compressor is cycled off and enables circulation of hot gaseous refrigerant under extreme high temperature ambient conditions.

21 Claims, 3 Drawing Sheets

REFRIGERATION SYSTEM SUBCOOLING FLOW CONTROL VALVE

FIELD OF THE INVENTION

This invention relates to refrigeration systems and more particularly to refrigeration systems used in household refrigerators and freezers.

BACKGROUND ART

Refrigeration systems for household refrigerators and freezers have heretofore been designed for low cost and high reliability, both of which require design simplicity together with a minimum number of parts. Typical refrigerators or freezers employ a vapor compression system having an electric motor driven hermetic compressor connected in a circuit with a condenser, evaporator, an optional accumulator, and a refrigerant flow restriction between the condenser and the evaporator.

The flow restriction is almost universally a capillary tube sized for optimal system efficiency under a nominal set of operating conditions. Such capillary tubes were designed for a constantly running refrigeration system operating at a single ambient temperature and constant load condition. Capillary tubes used as the sole restriction offered the advantages of low cost and high reliability. They performed satisfactorily under operating conditions other than those for which they were designed, albeit at reduced efficiency.

A system operating under these idealized design conditions utilized the condenser to liquify high pressure gaseous refrigerant from the compressor and delivered it, as a saturated or slightly subcooled liquid, to the capillary tube. The liquified refrigerant flowing through the capillary tube experienced a substantial pressure reduction on its way to the evaporator. Refrigerant was vaporized in the evaporator as it absorbed heat from a system load. The refrigerant then flowed to the compressor inlet as a low pressure gas.

When such a system operated under other than the optimum conditions it was far less efficient. For example, an extreme condition existed when the system "load" was light. In this case the heat in the refrigerated compartment was inadequate to evaporate the refrigerant in the evaporator so the evaporator tends to flood with liquid refrigerant.

This materially reduced the mass of refrigerant available in the system and consequently a mixture of hot gas and liquified refrigerant from the condenser tended to flow through the capillary tube into the evaporator. The gaseous refrigerant circulating in the system without condensing entered the evaporator and gave up heat to the liquified refrigerant there. The result was an undue burden on the compressor and significant system operating inefficiency.

When the load on the refrigerator or freezer was great and ambient atmospheric air temperature was high the system also operated inefficiently. In this condition the condenser could not reject sufficiently great amounts of heat to liquify all the refrigerant passing through it. Both liquified and gaseous refrigerant circulated in the system in these circumstances resulting in the operating problems noted above.

Although elimination, or at least reduction, of gaseous refrigerant flow into the evaporator was desirable to maximize efficiency, any significant restriction of hot gas flow at extremely high ambient temperatures was undesirable. Restricting such flow, for example by blocking communication from the condenser to the evaporator, was potentially damaging to the compressor.

In practice, the conditions under which household refrigerators or freezers operate vary widely from optimum design conditions. To accommodate varying conditions these appliances were constructed so that the compressor cycled on and off under control of a thermostat in the refrigerated compartment. When the thermostat was satisfied the compressor stopped. Refrigerant in the condenser continued to flow through the capillary to the evaporator until the system pressure equalized. This usually occurred after all the liquified refrigerant passed from the condenser into the evaporator.

When the thermostat restarted the compressor, gaseous refrigerant had to be compressed and recondensed for delivery to the evaporator before chilling could recur.

The rate at which the system pressure equalized and the rate at which chilling commenced again depended upon the degree of flow restriction created by the capillary. Capillary tubes sizes could be "loose" or "tight," i.e. less or more restrictive, respectively.

In a typical household freezer the capillary tube was sized "loose" to allow the evaporator to flood quickly during compressor start up. The "loose" capillary also allowed fast equalization of system pressure during the off cycle.

Fast evaporator flooding allowed the system to quickly reach a high running efficiency and reduced the compressor run time. Once the evaporator was flooded, however, this type of system tended to allow gas to enter the capillary tube and pass directly into the evaporator. As noted, circulation of hot gas in the system was inefficient and otherwise undesirable.

Furthermore, when the compressor turned off, the capillary tube continued to pass hot gas and liquid into the evaporator. This added more heat to the evaporator and further decreased overall system efficiency.

A principal advantage of a "loose" capillary design has been that fast pressure equalization enabled use of a low cost, low torque compressor motor for restarting the compressor after a short "off" cycle.

In typical household refrigerators "tight," or more restrictive, capillary tubes were used. Tight capillary systems tend to be slightly more efficient than "loose" systems during steady state run conditions. However when these systems were cycled on and off the "tight" capillary designs did not perform so well. The evaporators flooded so slowly during start up that any advantages in running efficiencies were lost over the entire cycle. Furthermore, pressure equalization took so long that low torque compressor motors experienced difficulty starting the compressor after a short off cycle. Such compressors were difficult to start against high back pressure.

In large refrigeration systems these problems were addressed by using a controlled expansion valve in place of the capillary tube. For example, Owens U.S. Pat. No. 3,367,130 discloses an expansion valve which opens and closes in response to the amount of subcooling of the refrigerant leaving the condenser by responding to a sensor attached to the external surface of the tube at that point. Valves of this type are too large and much too expensive to be substituted for a capillary tube in small household refrigeration systems.

Other proposals have involved using valves for blocking flow through the capillary tubes whenever the compressor turns off. These valves have been solenoid operated or have responded to changes in refrigerant pressure created by the compressor turning on and off. For example, see U.S. Pat. No. 4,267,702 issued May 19, 1981 to Houk. These kinds of valves did not modulate the refrigerant flows.

Still other proposals have suggested refrigerant flow modulating valves operated in response to liquified refrigerant temperature at the condenser outlet. These suggestions did not propose valve constructions capable of adequately controlling the flow of liquid refrigerant; did not provide easily manufactured structures; did not remedy problems caused by the circulation of hot gaseous refrigerant in the systems; and some did not block the refrigerant flow when the compressor was off.

The present invention provides a new and improved, highly efficient household refrigerator or freezer wherein a refrigerant flow controlling valve is provided which modulates the flow of liquified refrigerant through an expansion device in response to sensed condenser outlet refrigerant temperature and pressure conditions in a highly accurate fashion, blocks refrigerant flow from the condenser when the compressor is off and yet assures system refrigerant flow at extremely high ambient temperatures to protect the system.

DISCLOSURE OF THE INVENTION

A flow control valve constructed according to preferred embodiments of the invention is associated with a household refrigeration appliance having a vapor compression refrigeration system comprising a cyclically operated compressor, a condenser, an evaporator and an expansion device between the condenser and the evaporator. The refrigerant flow controlling valve is disposed between the condenser and the expansion device and comprises a housing defining a refrigerant flow chamber for receiving liquified refrigerant from the condenser outlet, valve seat structure defining a refrigerant flow port for communicating refrigerant from the condenser to the expansion device, and a refrigerant flow controlling valve assembly coacting with the valve seat structure to control the refrigerant flow from the refrigerant flow chamber to the expansion device. The new flow control valve is so constructed and arranged that it accurately controls system refrigerant flow in response to subcooling, blocks refrigerant flow from the condenser when the compressor is cycled off and enables circulation of hot gaseous refrigerant under extreme high temperature ambient conditions.

The flow controlling valve assembly comprises a valving member movable into and away from engagement with the valve seat structure and an expansible chamber pressure actuator for moving the valving member. The actuator has an operating fluid chamber containing a predetermined mass of vaporizable operating fluid in pressure and heat transfer relationship with refrigerant from the condenser outlet. The actuator biases the valving member toward its closed position to prevent refrigerant flow through the port when the compressor is cycled off and has a movable operating chamber wall structure for operating the valving member to vary the flow through the expansion device in response to the condenser outlet refrigerant temperature when the compressor is operating. The actuator operating fluid completely vaporizes at a predetermined relatively high condenser outlet refrigerant temperature (indicative of high ambient temperature) and the valve port is maintained open at condenser outlet refrigerant temperatures above the predetermined temperature.

The valve is constructed and arranged to enable its calibration by controlled distortion after it has been fabricated. This assures reliable and accurate operation. A valve seat supporting member forms a refrigerant flow chamber wall with a valve seat projecting from it. The seat supporting member is yieldable and is yielded to shift the valve seat location within the refrigerant flow chamber to a calibrated position.

In a preferred construction the actuator comprises a thin, flexible stiffly resilient metal diaphragm defining a wall of the actuator chamber. The actuator is disposed in the refrigerant flow chamber so that the diaphragm position is controlled by the refrigerant flow chamber temperature and pressure. The valving member is attached to the diaphragm and defines a generally flat, pliant valving face having an area substantially larger than that of the flow port.

The preferred housing comprises first and second cup-like housing members hermetically joined to form the chamber between them, each housing member having a cavity surrounded by a peripheral flange and a conduit extending from the cavity. The housing members are fixed with respect to each other at the flanges with the cavities confronting so the conduits form refrigerant flow chamber inlet and outlets.

BEST MODE FOR PRACTICING THE INVENTION

Figure 1:
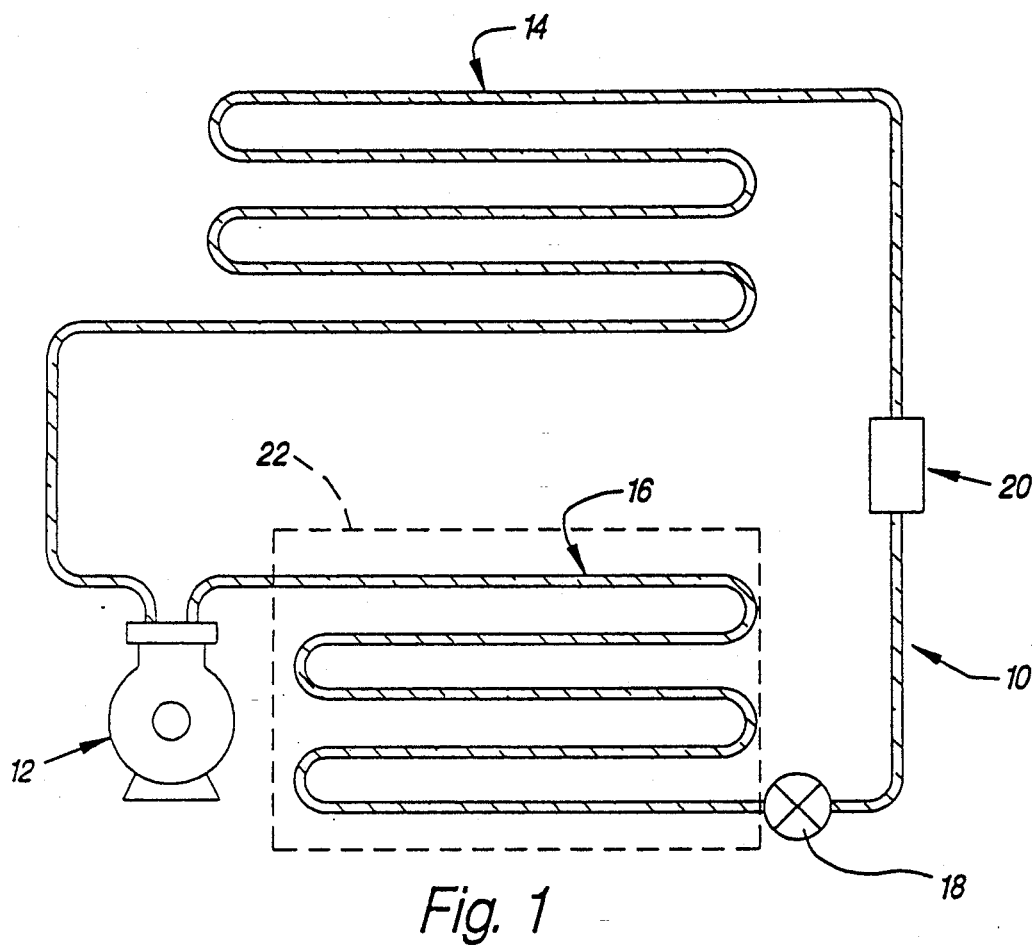
FIG. 1 is a schematic representation of a refrigeration system embodying a refrigerant flow control valve constructed according to the present invention.

A vapor compression refrigeration system 10 of the sort used in a household refrigerator or freezer is schematically illustrated in FIG. 1. The system 10 is a hermetic circuit containing a refrigerant, preferably R12. The system 10 comprises a compressor 12, a condenser 14, an evaporator 16, an expansion device 18 between the condenser and the evaporator, and a refrigerant flow controlling valve 20 between the condenser and the expansion device 18. The compressor circulates the refrigerant through the system 10 so that heat is transferred from a frozen food compartment 22 to the atmosphere ambient the system as the refrigerant successively evaporates and condenses in the evaporator and condenser. A thermostat (not illustrated) in the compartment 22 cyclically operates the compressor so that the compartment temperature is maintained within desired limits.

The compressor 12 compresses gaseous refrigerant flowing from the evaporator and delivers it, at an elevated temperature, to the condenser. The condenser. The condenser transfers heat from the refrigerant flowing through it to atmospheric air so that the refrigerant condenses in the condenser. Liquified refrigerant flows from the condenser through the expansion device 18 after which it enters the evaporator, having undergone a substantial pressure reduction.

The system geometry is such that the liquified refrigerant collects at the discharge end of the condenser before entering the expansion device. The expansion device 18 is preferably formed by a long, small bore capillary tube. The capillary tube design is "loose" in that the tube bore is sufficiently large to pass flows of the liquid refrigerant sufficient to relatively quickly flood the evaporator with liquid refrigerant when the compressor starts up.

Even though the capillary design is "loose," a quantity of the liquified refrigerant, substantially at the compressor discharge pressure, tends to be maintained in the downstream condenser end when the compressor is operating. The condenser continues to transfer heat from this liquified refrigerant so its temperature drops below the condensation temperature corresponding to the condenser pressure. This refrigerant condition is known as "subcooling." The extent of the subcooling depends upon various system operating conditions.

The refrigerant flow controlling valve 20 varies the refrigerant flow rate from the condenser to the evaporator according to refrigeration system operating parameters to assure efficient operation. The flow controlling valve 20 coacts with the expansion device 18 so that the rate of refrigerant flow into the evaporator varies between zero and the maximum flow permitted by the expansion device acting alone. This coaction enables the refrigeration system to quickly flood the evaporator when the compressor initially operates at the beginning of an "on" cycle (the expansion device being of "loose" design), yet virtually precludes the flow of any substantial amounts of gaseous refrigerant into the evaporator under normal operating conditions.

Figure 2:
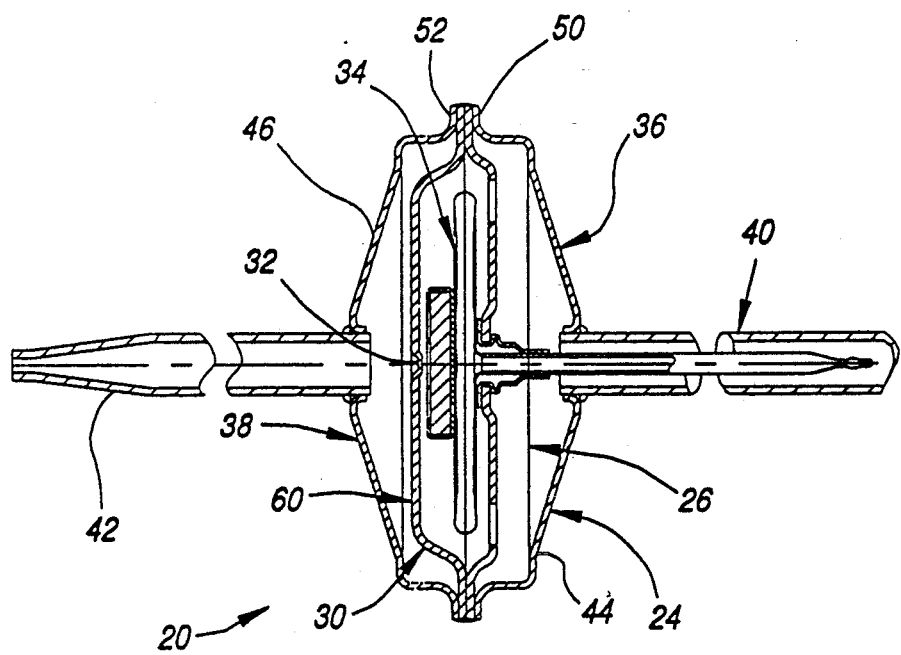
FIG. 2 is a cross sectional view of a preferred refrigerant flow controlling valve constructed according to the present invention.
Figure 3:
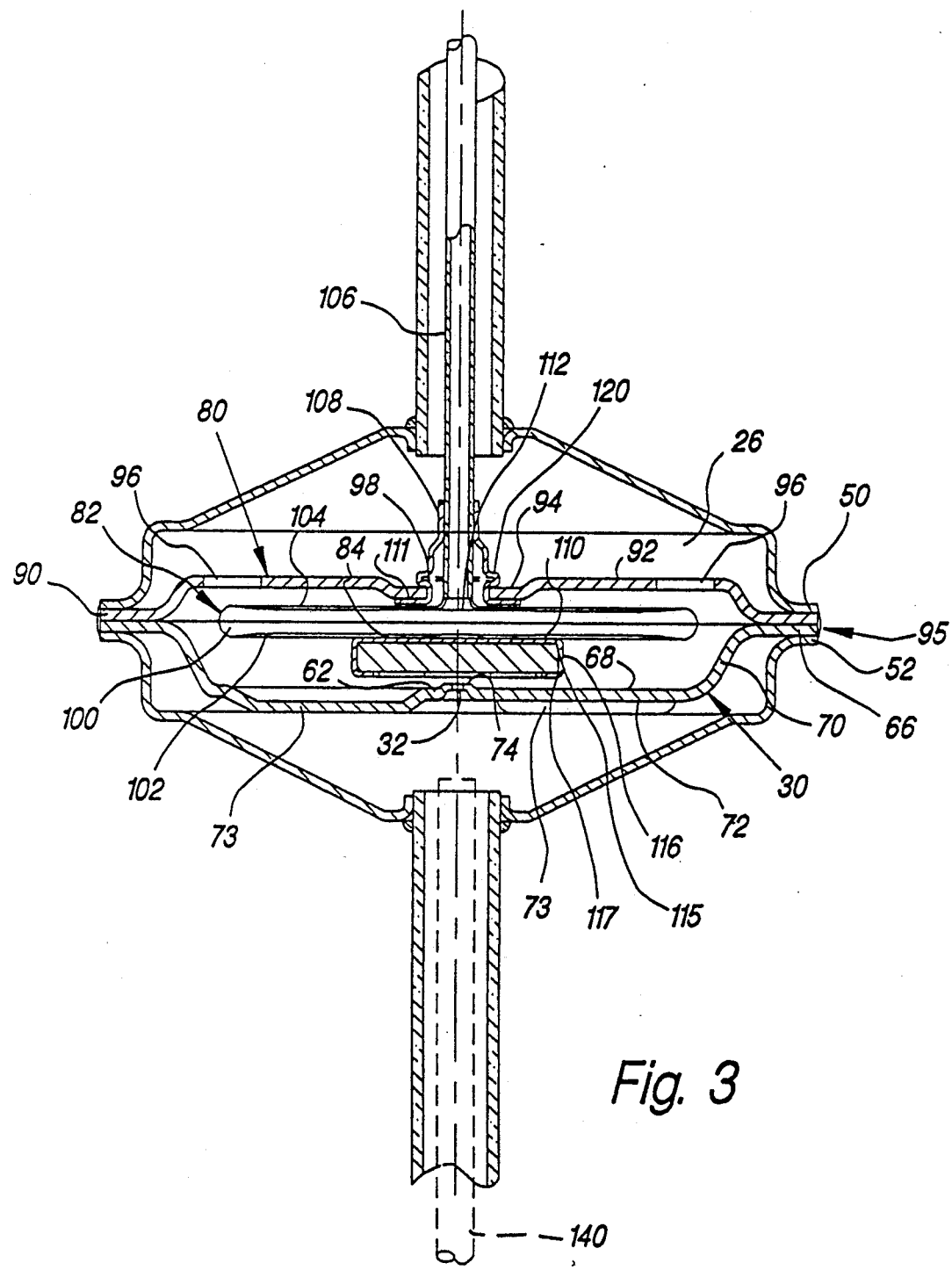
FIG. 3 is an enlarged cross sectional view of part of the flow controlling valve of FIG. 2; and, FIG. 4 is a graphic representation of vapor pressure versus temperature curves of system refrigerant and flow controlling valve operating fluid.

The preferred valve 20, illustrated in FIGS. 2 and 3, is particularly adapted for use in a household freezer. The valve 20 comprises a valve housing 24 defining a refrigerant flow chamber 26 in communication with the refrigerant condenser, a valve seat structure 30 forming a port 32 leading to the expansion device 18, and a refrigerant flow controlling valve assembly 34 coacting with the valve seat structure to control the flow of refrigerant from the refrigerant flow chamber. The valve 20 is constructed primarily of stamped sheet metal parts and is thus of simple, relatively inexpensive construction.

The valve housing 24 communicates the condenser 14 to the expansion device 18 and comprises first and second housing members 36, 38 forming the refrigerant flow chamber 26 and refrigerant flow conduits 40, 42, respectively, for directing the refrigerant into and away from the refrigerant flow chamber. The housing members 36, 38 are formed by respective concave confronting cup-like portions 44, 46, having confronting peripheral flanges 50, 52 hermetically secured together about the chamber 26. The conduits 40, 42 are illustrated as comprising refrigerant flow tubes projecting, respectively, to sealed, bonded (preferably brazed) joints (not shown) with the condenser 14 and the expansion device 18. The conduits are also joined to their respective housing members by sealed, bonded joints such as brazed connections.

The housing 24 is oriented with the conduit 40 extending upwardly to the condenser and the conduit 42 extending vertically downwardly to the device 18 (see FIG. 3). The chamber 26 is preferably below the lowest condenser elevation so liquified refrigerant from the condenser flows to the chamber and gaseous refrigerant remains above the liquid refrigerant level. Under most operating conditions the chamber 26 is flooded with the liquified refrigerant.

The flow control valve seat structure 30 forms part of the refrigerant flow chamber and in the valve illustrated in FIG. 3 comprises a seat support member 60 disposed in the chamber 26 and a valve seat 62 surrounding the refrigerant flow port 32. The illustrated seat support member 60 is formed by a plate having an outer marginal flange 66 hermetically joined between the confronting housing member flanges 50, 52 and a central support section 68 for the seat 62. The central section 68 defines a frustoconical wall 70 adjoining the flange 66, a generally planar annular wall 72 between the wall 70 and the seat 62, and a series of radially extending stiffening ribs 73 embossed in the wall 70. The rib embossments project from the plane of the wall 72 in the direction away from the valving member and in the illustrated valve 20, three ribs are provided extending 120 degrees apart about the port axis.

The valve seat 62 projects from the central section 68 and is illustrated in FIGS. 2 and 3 as formed by a central, drawn and pierced projection forming the port 32. The seat region immediately surrounding the port 32 is defined by an annular rim 74 having a sharply radiused projecting edge for contacting the valving structure 34. The rim 74 is quite narrow and the port 32 has a small area. The rim and port areas are slight to make negligible any differential pressure force changes acting on the valving structure when the flow controlling valve 20 is closed or nearly closed. The small rim area also reduces possible effects of localized transient pressure forces caused by high velocity refrigerant flows between the rim and the valving member when the valve is nearly closed.

The flow controlling valve assembly 34 governs refrigerant flow through the port 32 in relation to sensed refrigeration system conditions. The valve assembly 34 comprises a valve supporting structure 80 fixed with respect to the housing, an actuator 82, and a valving member 84 connected to the actuator for movement into and away from engagement with the valve seat structure for controlling the flow of refrigerant from the refrigerant flow chamber 26.

The valve supporting structure 80 is fixed in the chamber 26 for rigidly positioning and locating the actuator 82 and the valving member 84 with respect to the valve seat structure 30. The valve supporting structure 80 illustrated in FIGS. 2 and 3 comprises a rigid stamped sheet metal plate having an outer peripheral flange section 90, an annular body section 92, and a central, actuator support flange section 94. The flange section 90 is circular and conformed to the size and shape of the housing flanges. The section 90 is sandwiched between the housing flange 50 and the seat structure marginal flange 66 and is hermetically joined to the housing flanges 50, 52 and the marginal flange 66 by a continuous circumferential weld joint 95.

The body section 92 extends through the chamber 26 between the flange section 90 and the support flange 94. In the illustrated embodiment the body section forms an annular corrugation in the valve support structure. A series of refrigerant flow openings 96 is formed about the body section to permit unrestricted refrigerant flow through the chamber. The corrugated shape of the body section assures that the body section remains structurally strong and stiff regardless of the presence of the openings 96.

The actuator support flange 94 is a short, stiff annulus which surrounds a central actuator receiving opening 98. The flange 94 stiffly supports the actuator 82 generally along the center-line of the chamber 26.

The actuator 82 is constructed and arranged to shift the valving member 84 between fully opened and fully closed positions and to control the valving member position to modulate flow depending on sensed refrigerant temperature and pressure conditions. The preferred actuator 82 is an expansible chamber pressure actuator having a hermetic expansible operating chamber 100 filled with an operating fluid. The operating fluid is in both its liquid and vapor phases under normal operating conditions so the internal chamber pressure varies with temperature according to the pressure-temperature characteristics of the fill fluid saturated vapor. The fill fluid of the FIGS. 2 and 3 actuator is preferably R 500.

The preferred actuator comprises a stiffly resilient metal diaphragm 102 forming a movable wall of the operating chamber 100 and carrying the valving member. The position of the diaphragm 102 relative to the valve seat structure is determined by the refrigerant pressure in the chamber 26, the pressure of the fill fluid in the operating chamber 100 and the internal diaphragm spring force.

In the illustrated and preferred embodiment of the invention the actuator 82 is formed by a stiffly resilient single convolution metal bellows comprises of the diaphragm 102, a second diaphragm 104, a fill tube 106, a supporting eyelet 108, and an extension member 110. The diaphragms 102, 104 are stamped from a thin (e.g. 0.006 inch thick) leaf of stainless steel spring material and are initially identical dished discs.

The "top" (or uppermost, as viewed in the drawing, FIG. 3), diaphragm 104 is constructed to be anchored to the supporting structure 80 by the eyelet 108 which is formed by a malleable metal straight cylindrical sleeve-like body having an annular end flange 111. The eyelet end flange 111 is welded to the centerline of the disc about the opening and the diaphragm is pierced to form a central opening 112 along its centerline.

The "bottom" diaphragm 102 carries the valving member 84 on the extension member 110. The extension member illustrated by FIGS. 2 and 3 comprises a flat cylindrical cup-like body stamped from sheet metal. The body has a flat circular base 115, a cylindric wall 116, and projecting fingers 117 disposed about the projecting edge of the wall. The base 115 is welded securely to the diaphragm 102 with the wall 116 and fingers 117 projecting towards the valve seat.

The diaphragm discs are aligned in confronting relationship and bonded together about their peripheries by a continuous hermetic weld to provide the operating chamber 100 between them. The partially completed bellows is assembled to the supporting structure 80 with the eyelet 108 extending through the receiving opening 98. The eyelet is upset to form an outwardly extending corrugation 120 which clamps the eyelet firmly to the flange 94. The cylindrical end of the eyelet is swaged at the same time to reduce its diameter to approximate that of the fill tube 106.

The fill tube 106, initially open at both ends, is inserted in the eyelet end and hermetically brazed to the eyelet. The valving member 84 is inserted into the extension cup 110 and the fingers 117 are crimped into engagement with the valving member to secure it in place. The cup wall 116 extends just beyond the valving member toward the valve seat.

The preferred valving member 84 is a flat cylindrical disc defining a generally flat valving face confronting the valve seat. The valving face has an area which is quite large compared to the area of the port 32. The preferred and illustrated valving member 84 is composed of a tough, somewhat resilient plastic material, preferably polytetrafluoroethylene (e.g. Teflon) or equivalent, which is resiliently deflected when moved into positive sealing engagement with the valve seat without being cut or abraded by the rim 74. The valving member should be at least some what resilient to assure that the valving member 84 returns substantially to its undeflected condition when the valve is open. The rim of the extension cup wall 116 engages the seat structure wall 72 after the valve fully closes to limit compression of the valving member if the actuator exerts excessive force after closing the valve.

It should be noted that the ribs 73 form radially extending channels in the otherwise planar seat structure wall 72. These channels communicate refrigerant at flow chamber pressure to most of the valving member face even when the valve 20 is tightly closed. The small valving member face area occupied by the valve port 32 is insufficient to create a material differential pressure force on the valving member.

The Teflon or equivalent plastic material is preferred because it does not react with compressor lubricating oil circulating in the system with the refrigerant. Other materials, such as synthetic rubbers or other elastomers, can be used for the valving member so long as they are compatible with the system refrigerant and the compressor lubricant.

The bellows is then charged with the fill fluid in such a way that the flow controlling valve is opened at both the high and low ambient temperature operating extremes of the freezer (regardless of the operating condition of the compressor); the flow controlling valve closes when the compressor cycles off during normal operation; and the valve modulates the refrigerant flow in response to predetermined subcooling conditions.

A predetermined quantity of fill fluid is introduced to the bellows via the fill tube 106. Charging is carried out under strictly controlled pressure and temperature conditions so that under normal flow controlling valve operating conditions the bellows operates "above" (i.e. at greater than) its free height. That is, the bellows is extended against its own inherent spring force. In this charging condition, when the differential fluid pressure across the bellows diaphragms is zero the bellows force is relaxed and the bellows "retracts" to its free height. The flow controlling valve is opened in this condition. When the bellows has been charged with the proper amount of fluid the projecting fill tube end is crimped and sealed closed.

The fill fluid in the flow controlling valve of FIGS. 2 and 3 (R 500) is selected so that its saturated vapor pressure-temperature characteristic curve has, through the normal operating temperature range, a steeper slope than that of the system refrigerant (in this case R12). See FIG. 4 where the fill fluid saturated vapor pressure-temperature curve 132 is depicted with the refrigerant saturated vapor pressure-temperature curve 134. When the spring force of the bellows is taken into account, the effective fill fluid pressure-temperature characteristic curve is as illustrated by the line 135 of FIG. 4.

When the refrigerant and the fill fluid are both at temperatures ranging below about 50 F the effective fill fluid vapor pressure (curve 135) ranges from about the same as to substantially less than the saturated refrigerant vapor pressure (curve 134). This condition results in the bellows retracting toward its free height so the valve 20 opens.

When the fill fluid and refrigerant are at relatively normal operating temperature levels, e.g. above 50 F, the effective fill fluid pressure is markedly higher than the saturated refrigerant vapor pressure. The bellows extends above its free height and the valve closes if the compressor is not operating. If the compressor operates under these conditions the valve opens and may or may not modulate the refrigerant flow depending on sensed conditions.

Figure 4:
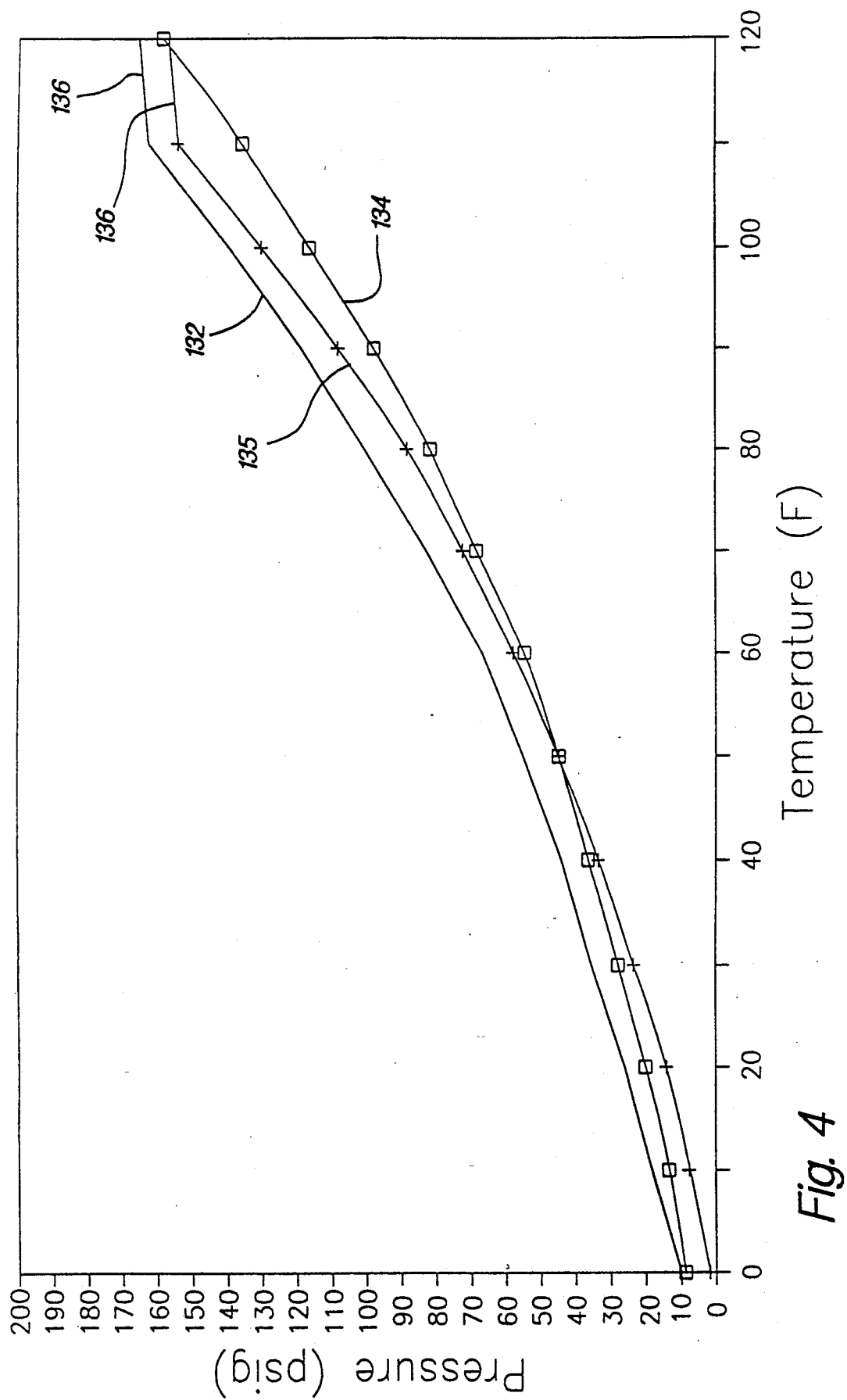

At an ambient temperature around 110 F the fill fluid completely evaporates. As the ambient temperature increases from that level the fill fluid vapor is superheated. The superheated vapor pressure-temperature characteristic curve approximates that of a socalled "perfect" gas (i.e. the slope of the pressure-temperature curve is much less than that of the refrigerant vapor pressure-temperature curve). This is illustrated in FIG. 4 at line segment 136. As a consequence, the saturated refrigerant pressure at elevated temperatures rises above the actuator operating chamber pressure and the bellows retracts to fully open the valve 20. The ambient temperature at which the fill fluid evaporates is determined by the quantity of fill fluid introduced into the actuator.

The actuator assembly and the valve seat structure are assembled with their flange peripheries aligned and then placed between the housing cups. The assembled elements are fixtured with all the outer flange peripheries aligned and the fill tube 106 extending part way through its associated conduit. The assembly is completed by welding the flanges 50, 52, 66 and, 90 to form the hermetic joint 95 about the flange junctures.

Calibration is accomplished by establishing predetermined conditions within the flow controlling valve and distorting the structure of the valve 20 to shift the relative positions of the port 32 and the valving member 84. An example of one calibration technique is to establish a given flow of air through the valve 20 at a predetermined pressure and temperature by yielding the valve seat supporting structure a controlled amount.

In one series of flow controlling valves it has been found that operationally satisfactory valves are so constructed and arranged that when such a valve is at a temperature of 70° F. (21° C.) and supplied with air or Nitrogen at that temperature and 78 psig, a flow rate of 0.15 scfm is established through the valve. To calibrate an uncalibrated valve, the valve is maintained at 70° F. and supplied with 70° F. Nitrogen or air until a flow rate of 0.15 scfm is observed. The gas pressure at this flow rate is less than 78 psig.

A calibration ram 140 (schematically illustrated in FIG. 3) inserted in the conduit 42 is forced against the seat support structure while the flanges 50, 52, 66 and 90 are securely held in place. The "bumping" force applied to the seat yields the support section 68 so that the rim 74 is moved toward the valving member 84. This increases the gas pressure required to achieve a 0.15 scfm flow rate. The process is repeated as necessary until the 78 psig-0.15 scfm calibration condition has been established.

In the preferred valve 20, the supporting section 68 is yielded in a generally circular path extending about the radially outer ends of the embossed ribs 73. The ribs are quite stiff and thus dictate where the yielding deflection takes place and thus aid in assuring reliable calibration.

Other calibration techniques can be employed. For example, the valve seat structure can be deformed by introducing high pressure air or Nitrogen into the chamber section between the valve seat structure and the housing cup 46. Such a gas, at about 650 psi, is effective to deform the seat plate for calibration purposes. The port 34 has a sufficiently small area that the deforming gas pressure is easily maintained in the housing without subjecting the actuator 82 to excessive external pressure.

When the calibration is completed the outlet conduit 42 is swaged to reduce the diameter of its outlet and the completed valve 20 is ready for assembly into a freezer unit refrigeration system. In the preferred construction the valve 20 is brazed into the refrigeration system and oriented so refrigerant flow through the valve occurs generally vertically downwardly from the condenser through the valve 20 toward the expansion device 18. This valve orientation tends to reduce the possibility of reduced pressure refrigerant remaining in the vicinity of the seat supporting structure after passing through the port 32 and evaporating there. Such evaporation could cause conductive heat transfer from the actuator fill fluid through the extension member 110 and the valving member 84, to the evaporating refrigerant via the valve seat structure.

The fill fluid vapor pressure depends on the temperature of the coolest actuator location because that temperature governs condensation of the fill fluid. Conductive heat transfer away from the actuator might thus cause inappropriate actuator response because the actuator would respond to the evaporating refrigerant temperature downstream from the valve port 32 rather than the refrigerant temperature in the flow chamber 26.

After the valve 20 is installed in the freezer the refrigerant system is charged with refrigerant and the system is operated. During normal operation, at relatively high ambient temperatures, the flow controlling valve 20 tends to be open when the compressor is running. In this operating condition the valving member 84 is positioned according to the lowest flow chamber refrigerant temperature detected by the actuator 82. If the refrigeration system is heavily loaded (for example when a large quantity of room temperature meat has just been placed in the freezer) the flow chamber refrigerant temperature is relatively high, signifying that the undesirable passage of hot gas through the expansion device might be imminent. The operating chamber pressure increases as the refrigerant temperature increases so the valving member moves toward the port 32 and restricts the refrigerant flow from the flow chamber 26. This action tends to minimize the possibility of hot gas flowing through the expansion device into the evaporator.

As the system load is reduced (for example when the freezer contents reach the thermostat set point temperature) the quantity of liquified refrigerant at the condenser discharge end is increased and refrigerant in the flow chamber is subcooled. Accordingly the flow chamber refrigerant temperature is reduced resulting in the valving member retracting from the valve port so the refrigerant flows in a less restricted way from the chamber.

When the food compartment thermostat is satisfied the compressor is cycled "off" and the flow controlling valve 20 closes promptly so that the refrigerant in the condenser remains there at high pressure during the time the compressor is not operating (freezer compartment cooling is not called for). When the compressor cycles "off" the pressure in the condenser drops precipitately toward the saturated vapor pressure of the refrigerant in the condenser. The forces acting on the actuator diaphragm promptly come into balance with the actuator stabilizing in its extended position so the flow controlling valve 20 is closed. The forces acting on the diaphragm are the fill fluid vapor pressure force; the bellows spring force; and, the refrigerant vapor pressure force. The spring and the refrigerant pressure forces oppose the fill fluid pressure force and balance the fill fluid pressure force when the bellows is positioned "above" its operating height with the valve closed. This feature of the valve 20 also provides for failsafe operation in that if the actuator operating fluid chamber should leak or be holed for any reason, the fluid pressures acting on the bellows would be balanced and the valve would open due to the diaphragm spring force.

The valve 20 opens automatically when the compressor restarts. The thermostat calls for compartment cooling by turning the compressor "on" and the condenser pressure rises to the compressor discharge level. This creates additional pressure force acting on the actuator bellows in opposition to the fill fluid pressure force. Assuming normal operating conditions, the bellows retracts and the valve 20 opens.

Household freezers are sometimes located in unheated spaces (such as garages), or evenout-of-doors (for example on open porches), where the atmospheric temperature ambient the freezer may be quite low. In such environments freezers are quite lightly loaded but even so, compressors cycle periodically because compartment temperature set points are below the ambient air temperature and compartment heat gains occur. At low ambient temperatures the system temperature is so low that operation of the compressor may not produce an appreciable condenser pressure rise.

Accordingly, when the compressor cycles "on," the condenser pressure may not be relied on to increase sufficiently to open the flow controlling valve 20. If the valve 20 remains closed the food compartment thermostat can not be satisfied and the compressor continues operating. All the system refrigerant may be delivered into the condenser. Since the compressor lubricating oil is circulated in the system by the refrigerant the compressor can be damaged from insufficient lubrication.

The preferred flow controlling valve is biased to its open condition when the ambient temperature is low. The preferred valve 20 thus enables continued system refrigerant flow at low ambient temperatures regardless of the compressor operating condition. This operational feature protects the compressor without materially reducing the refrigeration system operating efficiency because the system is extremely efficient at low ambient temperatures anyway.

As noted previously the flow controlling valve 20 illustrated by FIGS. 2 and 3 employs an actuator bellows filled with a fluid (R 500) whose saturated vapor pressure-temperature curve is sloped more steeply than the saturated vapor pressure-temperature curve of the system refrigerant (R12). Comparing the curves 134 and 135 of FIG. 4 reveals that at low ambient temperatures the system refrigerant vapor pressure force and the diaphragm spring force exceed the actuator operating fluid pressure force. Thus the actuator is biased to open the valve 20.

The valving member 84 is moved only a short distance between its full flow and fully closed positions. When the valving member is between these limiting flow positions the refrigerant flow through the port is modulated so that the refrigerant pressure drop between the condenser and the evaporator varies in accordance with the degree of refrigerant subcooling. The preferred single convolution bellows is quite stiff and has a relatively linear spring characteristic through the range of valving member positions between closed and full flow. That is, the actuator spring force opposing extension of the bellows remains substantially constant over the operating range of bellows positions. The flow controlling valve is thus quite sensitive in its response to detected refrigerant pressure and temperature conditions indicative of the degree of its subcooling.

With some slight modifications the valve 20 can be employed in household refrigerators or refrigerator/freezer combinations. Refrigerators and refrigerator/freezers are not designed for use in cold surroundings and therefore do not necessarily require the flow controlling valve to remain open at low ambient temperatures when the compressor is off. Accordingly when so used the valve 20 contains a fill fluid which is the same as the system refrigerant, i.e. R12. The saturated vapor-liquid fill fluid and the bellows coact such that the bellows diaphragm spring force closes the valve 20 when the compressor is off (i.e. the saturated vapor pressure forces within and outside the bellows chamber are balanced). In some refrigerator systems it may also be desirable to form the valving member from a synthetic rubber material rather than "Teflon" so long as the system refrigerant and lubricant do not react to the rubber selected.

While a single preferred embodiment of the invention has been illustrated and described in detail the invention is not to be considered limited to the precise construction disclosed. Various adaptations, modifications and uses of the invention may occur to those skilled in the art to which the invention relates. The intention is to cover all such adaptations, modifications and uses falling within the scope or spirit of the appended claims.

Having described our invention we claim:

1. In a vapor compression refrigeration system comprising a periodically operated compressor, a condenser, and an evaporator; a refrigerant flow controlling valve between the condenser and the evaporator for controllably varying the refrigerant pressure drop between the condenser and the evaporator, said refrigerant flow controlling valve comprising:
   a. a valve housing defining a refrigerant flow chamber receiving liquified refrigerant from the condenser;
   b. valve seat structure comprising a projecting valve seat defining a refrigerant flow port for communicating refrigerant from said flow chamber to the
   - evaporator; and,
   c. a refrigerant flow controlling valve assembly coacting with said valve seat structure to control the flow of refrigerant from said refrigerant chamber, said flow controlling valve assembly comprising:
      i) a valve supporting structure within and fixed with respect to said housing;

ii) an actuator comprising at least a thin, flexible stiffly resilient metal diaphragm defining a wall of a hermetic expansible actuator chamber containing a vaporizable fluid, said fluid comprising liquid and vapor fractions when the fluid temperature is less than a predetermined temperature, said fluid in heat transfer relationship with refrigerant in said flow chamber so that the actuator chamber pressure is controlled by the refrigerant temperature in said flow chamber, said diaphragm flexing in response differential pressure changes between said chambers; and, iii) a valving member connected to said diaphragm for movement by said diaphragm into and away from engagement with said valve seat structure for modulating the flow of refrigerant from said refrigerant chamber between a no flow condition and a maximum flow rate condition, said valving member defining a generally flat, pliant valving face having an area substantially larger than said refrigerant flow port, said valving face coacting with said valve seat within a relatively narrow range of valving member movement to modulate the refrigerant flow from said flow chamber.

2. The flow control valve claimed in claim 1 wherein said valve seat structure further comprises a valve seat supporting member having a yieldable support portion forming an internal wall in said flow chamber, said support portion yielded to shift its position in the chamber and station said valve seat with respect to said valve supporting structure at a calibrated location.

3. The flow control valve claimed in claim 1 wherein said valve housing is formed by confronting cup members having aligned cavities forming said flow chamber with each cavity surrounded by peripheral flanges which are hermetically joined.

4. The flow control valve claimed in claim 3 wherein said valve seat structure comprises a seat support member having an outer marginal flange aligned with said peripheral cup member flanges and hermetically attached thereto.

5. The flow control valve claimed in claim 4 further comprising valve supporting structure fixed with respect to said housing and comprising a flange section aligned with and hermetically connected to said cup member flanges and said seat structure flange.

6. The flow control valve claimed in claim 1 wherein said valving member is comprised of a flexible material which flexes when engaging said valve seat when said valving member closes said port.

7. The flow control valve claimed in claim 6 wherein said valving member material is resiliently deformable by contact with said valve seat.

8. The flow control valve claimed in claim 1 wherein said actuator comprises a single convolution bellows comprised of said first and a second stiffly resilient diaphragm, said diaphragms hermetically joined at their outer peripheries to form said actuator chamber, said first diaphragm carrying said valving member and shifting said valving member through a stroke which is extremely small compared to the diameter of the diaphragm.

9. The flow control valve claimed in claim 1 further comprising compression limiting structure reacting between said actuator and said valve seat structure for limiting compression of said valving member.

10. The flow control valve claimed in claim 1 wherein said actuator chamber is filled with a predetermined quantity of vaporizable fluid, said fluid completely vaporizing at said predetermined temperature and altering the pressure-temperature response of said actuator at flow chamber temperatures above said predetermined temperature.

11. In a household refrigeration appliance having a vapor compression refrigeration system comprising a cyclically operated compressor, a condenser, an evaporator and an expansion device between the condenser and the evaporator; a refrigerant flow controlling valve between the condenser and the expansion device comprising:

a. a housing defining a refrigerant flow chamber for receiving refrigerant from the condenser outlet;

b. valve seat structure defining a refrigerant flow port for communicating refrigerant from the condenser to the expansion device; and, c. a refrigerant valving assembly coacting with said valve seat structure to control the flow of refrigerant through said port, said valving assembly comprising a valving member movable into and away from engagement with said valve seat structure for controlling the flow of refrigerant through said port, and an expansible chamber pressure actuator for moving said valving member;

d. said actuator defining an operating fluid chamber containing a predetermined mass of vaporizable operating fluid in pressure and heat transfer relationship with refrigerant from the condenser outlet, said actuator biasing said valving member toward its closed position to prevent refrigerant flow through the port when the compressor is cycled off, said actuator comprising movable operating chamber wall structure for operating the valving member to vary the flow through the expansion device in response to the temperature of condenser outlet refrigerant when the compressor is operating, said operating fluid completely vaporizing at a predetermined relatively high condenser outlet refrigerant temperature to maintain the valve port open at condenser outlet refrigerant temperatures above said predetermined temperature.

12. The refrigeration appliance claimed in claim 11 further comprising a valve seat supporting wall member having a yieldable support portion, said support portion yielded to shift its position relative to the chamber and station said valve seat with respect to said valve supporting structure at a calibrated location.

13. The flow control valve claimed in claim 11 wherein said actuator comprises a single convolution bellows comprised of first and a second stiffly resilient diaphragms, said diaphragms hermetically joined at their outer peripheries to form said operating fluid chamber, said first diaphragm carrying said valving member and shifting said valving member through a stroke which is extremely small compared to the diameter of the diaphragm.

14. The flow control valve claimed in claim 13 wherein said valving member defines generally flat, pliant valving face having an area substantially larger than said refrigerant flow port, said valving face coacting with said valve seat to control the refrigerant flow from said flow chamber.

15. In a household refrigeration appliance having a compartment chilled by a vapor compression refrigeration system comprising a cyclically operated compressor, a condenser, an evaporator and an expansion device between the condenser and the evaporator; a refrigerant flow controlling valve between the condenser and the expansion device for controllably varying the refrigerant pressure drop between the condenser and the evaporator beyond that produced by said expansion device alone, said refrigerant flow controlling valve comprising:

a. a housing defining a refrigerant flow chamber for receiving liquified refrigerant from the condenser outlet, said housing comprising;
  i. first and second cup-like housing members hermetically joined to form said chamber between them;
  ii. each housing member having a cavity surrounded by a peripheral flange and a conduit extending from the cavity;
  iii. said housing members fixed with respect to each other at the flanges with the cavities confronting so the conduits form refrigerant flow chamber inlet and outlet conduits;
b. valve seat structure defining a refrigerant flow port for communicating refrigerant from the condenser to the expansion device, said valve seat structure comprising;
  i. a valve seat supporting member forming an internal wall extending across said flow chamber to separate said inlet and outlet conduits;
  ii. a valve seat projecting from said wall and defining said flow port for enabling refrigerant flow from said inlet conduit to said outlet conduit;
  iii. said seat supporting member comprising a yieldable wall portion which is yielded to shift the valve seat within the refrigerant flow chamber to a calibrated position;
c. a refrigerant flow controlling valve assembly coacting with said valve seat structure to control the flow of refrigerant from said refrigerant chamber, said flow controlling valve assembly comprising a flow controlling valving member, valving member supporting structure fixed with respect to said housing, and a valving member actuator for moving said valving member into and out of engagement with said valve seat;
d. said actuator comprising:
  i. at least a thin, flexible stiffly resilient metal diaphragm defining a wall of a hermetic, expansible actuator chamber containing a vaporizable fluid, said fluid comprising liquid and vapor fractions when the fluid temperature is less than a predetermined temperature;
  ii. said actuator disposed in said refrigerant flow chamber and supported by said valving member supporting structure with said diaphragm in fluid pressure and heat transfer relationship with refrigerant in said flow chamber so that the fluid pressure in said actuator chamber is controlled by the refrigerant temperature in said flow chamber and the diaphragm position is effected by the pressure of refrigerant in said flow chamber; and,
e. said valving member comprising;
  i. connected to said diaphragm for movement into and away from engagement with said valve seat structure for controlling the flow of refrigerant from said refrigerant chamber, said valving member defining a generally flat, pliant valving face having an area substantially larger than said refrigerant flow port, said valving face coacting with said valve seat to control the refrigerant flow from said flow chamber.

16. A flow control valve for a vapor compression refrigeration system comprising a periodically operated compressor, a condenser, and an evaporator, said flow control valve disposed between the condenser and the evaporator and comprising a housing defining a refrigerant flow chamber for receiving liquified refrigerant from the condenser outlet, valve seat structure defining a refrigerant flow port for communicating refrigerant from the condenser to the evaporator, and a refrigerant flow controlling valve assembly coacting with the valve seat structure to control the refrigerant flow from the refrigerant flow chamber to the expansion device, said flow control valve assembly comprising a valving member and a valving member actuator, said valving member moving to and away from engagement with said port for controlling system refrigerant flow, said actuator positioning said valving member relative to said port and having a stiffly resilient member defining at least part of an expansible operating fluid chamber containing a predetermined mass of vaporizable operating fluid in pressure and heat transfer relationship with refrigerant in said flow chamber, said actuator moving said valving member in response to sensed refrigerant subcooling for blocking refrigerant flow from the condenser when the compressor is cycled off, said operating fluid vaporizing at a predetermined temperature so that said actuator positions said valving member to open said port for enabling circulation of hot gaseous refrigerant under extreme high temperature ambient conditions.

17. In a household refrigeration appliance having a compartment chilled by a vapor compression refrigeration system comprising a cyclically operated compressor, a condenser, an evaporator and an expansion device between the condenser and the evaporator; a refrigerant flow controlling valve between the condenser and the expansion device for controllably varying the refrigerant pressure drop between the condenser and the evaporator beyond that produced by said expansion device alone, said refrigerant flow controlling valve comprising:

a. a valve housing defining a refrigerant flow chamber receiving liquified refrigerant from the condenser;
b. valve seat structure comprising a projecting valve seat defining a refrigerant flow port for communicating refrigerant from said flow chamber to the expansion device; and,
c. a refrigerant flow controlling valve assembly coacting with said valve seat structure to control the flow of refrigerant from said refrigerant chamber, said flow controlling valve assembly comprising:
  i. a valve supporting structure within and fixed with respect to said housing;
  ii. an actuator comprising at least a thin, flexible stiffly resilient metal diaphragm defining a wall of a hermetic expansible actuator chamber containing a vaporizable fluid, said fluid comprising liquid and vapor fractions when the fluid temperature is less than a predetermined temperature, said fluid in heat transfer relationship with refrigerant in said flow chamber so that the actuator chamber pressure is controlled by the refrigerant temperature in said flow chamber; and,
  iii. a valving member connected to said diaphragm for movement into and away from engagement with said valve seat structure for controlling the flow of refrigerant from said refrigerant chamber, said valving member defining a generally flat, pliant valving face having an area substantially larger than said refrigerant flow port, said valving face coacting with said valve seat to control the refrigerant flow from said flow chamber;

d. said valve seat structure further comprising a valve seat supporting member having a yieldable support portion forming an internal wall in said flow chamber, said support portion yielded to shift its position in the chamber and station said valve seat with respect to said valve supporting structure at a calibrated location.

18. In a vapor compression refrigeration system comprising a periodically operated compressor, a condenser, and an evaporator; a refrigerant flow controlling valve between the condenser and the evaporator comprising:

a. a housing defining a refrigerant flow chamber for receiving refrigerant from the condenser outlet;

b. valve seat structure defining a refrigerant flow port for communicating refrigerant from the condenser to the evaporator; and, c. a refrigerant valving assembly coacting with said valve seat structure to control the flow of refrigerant through said port, said valving assembly comprising a valving member movable into and away from engagement with said valve seat structure for controlling the flow of refrigerant through said port, and an expansible chamber pressure actuator for moving said valving member;

d. said actuator defining an operating fluid chamber containing a predetermined mass of vaporizable operating fluid in pressure and heat transfer relationship with refrigerant from the condenser outlet, said actuator biasing said valving member toward its closed position to prevent refrigerant flow through the port when the compressor is cycled off, said actuator comprising movable operating chamber wall structure for operating the valving member to vary the flow through the expansion device in response to the temperature of condenser outlet refrigerant when the compressor is operating, said operating fluid completely vaporizing at a predetermined relatively high condenser outlet refrigerant temperature to maintain the valve port open at condenser outlet refrigerant temperatures above said predetermined temperature.

19. The system claimed in claim 18 further comprising a valve seat supporting wall member having a yieldable support portion, said support portion yielded to shift its position relative to the chamber and station said valve seat with respect to said valve supporting structure at a calibrated location.

20. The system claimed in claim 18 wherein said actuator comprises a single convolution bellows comprised of first and a second stiffly resilient diaphragms, said diaphragms hermetically joined at their outer peripheries to form said operating fluid chamber, said first diaphragm carrying said valving member and shifting said valving member through a stroke which is extremely small compared to the diameter of the diaphragm.

21. The system claimed in claim 20 wherein said valving member defines generally flat, pliant valving face having an area substantially larger than said refrigerant flow port, said valving face coacting with said valve seat to control the refrigerant flow from said flow chamber.

* * * * *